United States Patent
Cho et al.

(10) Patent No.: US 7,333,260 B2
(45) Date of Patent: Feb. 19, 2008

(54) TWO-DIMENSIONAL IMAGE PROJECTION SYSTEM

(75) Inventors: Gyoung Il Cho, Seoul (KR); Tae Hyeon Kim, Taejeon (KR); Cheong Soo Seo, Seoul (KR)

(73) Assignee: Stereo Display, Inc., Fullerton, CA (US)

( * ) Notice: Subject to any disclaimer, the term of this patent is extended or adjusted under 35 U.S.C. 154(b) by 39 days.

(21) Appl. No.: 10/914,474

(22) Filed: Aug. 9, 2004

(65) Prior Publication Data

US 2006/0028709 A1    Feb. 9, 2006

(51) Int. Cl.
G02B 26/00    (2006.01)

(52) U.S. Cl. ............ 359/291; 359/290; 345/108

(58) Field of Classification Search ....... 359/291, 359/290, 295, 298, 223, 224, 625, 626, 318; 345/108; 347/239
See application file for complete search history.

(56) References Cited

U.S. PATENT DOCUMENTS

| | | | |
|---|---|---|---|
| 5,535,047 A | 7/1996 | Hornbeck | 359/295 |
| 6,232,936 B1 | 5/2001 | Gove et al. | 345/85 |
| 6,906,849 B1 * | 6/2005 | Mi et al. | 359/291 |
| 6,934,072 B1 * | 8/2005 | Kim et al. | 359/291 |
| 2002/0135673 A1 * | 9/2002 | Favalora et al. | 348/42 |
| 2005/0180019 A1 * | 8/2005 | Cho et al. | 359/626 |
| 2006/0012766 A1 * | 1/2006 | Klosner et al. | 355/67 |
| 2006/0187524 A1 * | 8/2006 | Sandstrom | 359/291 |

OTHER PUBLICATIONS

Boyd, James G.; Fast-response Variable Focusing Micromirror array Lens, SPIE vol. 5055(2003).*
James G. Boyd and Gyoungil Cho, "Fast-response Variable Focusing Micromirror Array Lens," Proc. SPIE, vol. 5055, pp. 278-286 (2003).

* cited by examiner

Primary Examiner—Timothy Thompson (57) ABSTRACT

A two-dimensional image projection device using array of micromirror array lenses and a random scanning technique is invented. Using the random scanning technique, the light efficiency is nearly doubled than that of the prior art. The invention makes a brighter and less power consuming display device possible. Because each micromirror array lens of array of micromirror array lenses can scan whole image plane, a fast self diagnosis and correction technique can be introduced in displaying device. The Self diagnosis and correction technique makes display device to maintain image quality even a few tens percent of micromirrors do not work properly. Owing to the scanning characteristics of micromirror array lens, the image projection device can express the same number of pixels image with less number of micromirrors than the prior art. This also enables small sized two-dimensional image projector, which can be incorporated in portable electronic equipments.

24 Claims, 6 Drawing Sheets

FIG. 1

PRIOR ART

TWO-DIMENSIONAL IMAGE PROJECTION SYSTEM

FIELD OF THE INVENTION

The present invention relates generally to an image projection system, and more specifically, to a two-dimensional image projection system comprising an array of micromirror array lenses.

BACKGROUND

Figure 1:
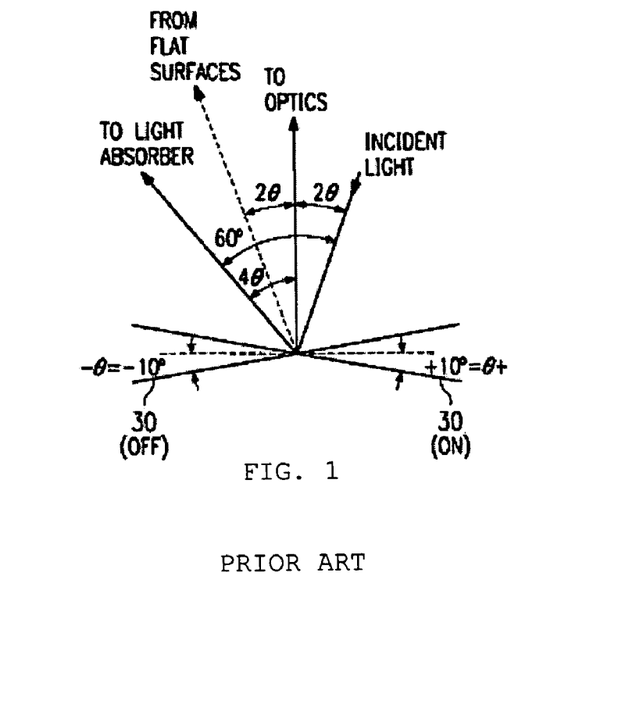
FIG. 1 is an illustration of the two stable deflected states of a prior art pixel mirror for deflecting incident light in one of two directions.

Spatial light modulators (SLM) have been used in projection display systems to increase image resolution and display brightness. For example, a Digital Micromirror Device (DMD) array, as described in U.S. Pat. Nos. 5,535,047 and 6,232,936, was used for two-dimensional image projection devices. According to this teaching, each micromirror of the DMD array has single-degree-of-freedom, rotation about an axis, and works as a simple optical switch. Since the DMD array is merely an array of optical switches, the direction of light is limited. As shown in FIG. 1, the DMD array has only two positions; one is the "on" position and the other is the "off" position. When the DMD array is applied to a two-dimensional image projection device, such as projectors and projection televisions, simple "on-off" behavior limits its light efficiency and becomes the main reason for its high power consumption. According to the prior art, the DMD array uses at most fifty percent (50%) of incident light because it only has "on" or "off" positions. In that regard, the light is dumped when the mirror is at it "off" position. In order to improve brightness and power efficiency of two-dimensional image projection system, most of the reflected light should be projected onto the screen.

In the prior art, a lens comprising a micromirror array was proposed by Boyd and G. Cho in their paper entitled, "Fast-response Variable Focusing Micromirror Array Lens", *Proc. SPIE*, Vol. 5055, 278–286 (2003). Although micromirror array lens is capable of changing its focal length in a very sort amount of time, the micromirror array lens is not capable of being used in two-dimensional display devices because its optical axis is fixed. Moreover, since the micromirror array lens is a reflective type lens with a fixed optical axis, additional optical components, such as beam splitter, are required. The additional optical components deteriorate the light efficiency, and increase complexity and cost of the optical system.

Thus, there is a practical need for a two-dimensional image projection system that incorporates the advanced focusing capabilities of micromirror array lenses to improve brightness and power efficiency over existing projection systems. It is desired that such system be easy to manufacture and capable of being used with existing two-dimensional projections systems and devices.

SUMMARY OF THE INVENTION

The present invention is directed to an image projection device for displaying two-dimensional images. The device comprises an array of micromirror array lenses. Each micromirror array lens is comprised of an arbitrary group of micromirrors. The group of micromirrors vary according to the image displayed. The micromirrors are individually controlled electrostatically and/or electromagnetically by actuating components. The micromirrors are provided with three-degree-of-freedom motion; one translational motion along the normal axis to the plane of lens and two rotational motions about the axes in the plane. The translational motion is required to meet the phase matching condition to compensate for aberrations. The two rotational motions are required to deflect and focus the light, and are essential to the versatility of the array of micromirror array lenses.

In use, the device comprises a light source that generates collimated light that incidents from the light source to the lens array. The light is reflected from the micromirror array lenses and focused onto a projection plane, where in the resulting image is viewed. Since each micromirror array lens has the ability to scan the in-focused light along the projection plane, any two or more micromirror array lenses can simultaneously focus incident light onto different positions, or the same position along the projection plane. Because each micromirror array lens can scan the whole plane (i.e., focus the incident light at any position along the plane), the projected image can be generated.

When the array of micromirror array lenses is applied to the conventional two-dimensional display devices, such as projector and/or projection television, the brightness of the projected image and power consumption of the display device are greatly improved by increasing light efficiency over prior art DMD array devices. The array of micromirror array lenses can use most incident light by adopting an optimized Random Scanning Technique. In accordance with this technique, a random scanning processor analyses brightness of each frame, and optimizes the focusing position and scanning speed of each micromirror array lens. For the purposes of the present invention, "random" means scanning is not sequential. Accordingly, in order to optimize the set of micromirror array lens combinations which can minimize the movement, minimize construction and destruction of the micromirror array lens, and the minimize scanning length for a frame rate, each micromirror array lens: (a) has an arbitrary number of micromirrors; (b) scans a plane with different speed; and (b) focus light at random positions in the plane.

The random scanning technique also enables the number of micromirrors to be less than the number of image pixels without deterioration of the resolution of projected images. The gray scale of each pixel is easily achievable by controlling scanning speed and/or by controlling the number of micromirrors of each micromirror array lens.

Small sized array of micromirror array lenses can be implemented in portable electronic equipments such as mobile phones, personal digital assistants (PDA), camcorder, or even laser pointers. In such devices, the array of micromirror array lenses are combined with a laser diode modules and an automatic focusing unit to provide a very small pocket-sized two-dimensional image projector. Such devices also enable users to view large projected images from their mobile phones, personal digital assistants (PDA), and so on.

The present invention is also applicable to optical scanners, photo copy machines, laser printers, and other applicable image projection devices. In addition, the present invention may be applied to three-dimensional integrated imaging devices.

In conclusion, the advantages provided by the present invention over image projection systems of the prior art, are:

(1) It improves brightness and power consumption of a two-dimensional image projection systems;

(2) It provides a portable, pocked-sized, high quality two-dimensional image projectors;

(3) The present invention may be used in a variety of applications because each micromirror array lens of the array of micromirror array lenses can be controlled independently to have different focal length, different optical axis, lens size, and lens shape;

(4) Each micromirror array lens of the array of micromirror array lenses can be controlled to scan a plane with different speeds to easily control the light intensity of the displayed image; and (5) A group of micromirror array lenses of the lens array can be controlled to scan the same point simultaneously to easily control the light intensity of the displayed image.

BRIEF DESCRIPTION OF THE DRAWINGS

These and other features, aspects and advantages of the present invention will be better understood by reference to the following detailed description when considered in conjunction with the accompanying drawings, wherein.

DETAILED DESCRIPTION OF THE INVENTION

In a particularly preferred embodiment of the invention there is provided a two-dimensional image projection device comprising an array of micromirror array lenses. Each micromirror array lens comprises a plurality of micromirrors, whose configurations may be adjusted to change the focal length, optical axis, lens size, the number of lenses, shape of lens, and others of the micromirror array lens. When applied to conventional two-dimensional display devices, the array of micromirror array lenses greatly improve the brightness of the projected image and the power consumption of the display device by increasing light efficiency.

Figure 2:
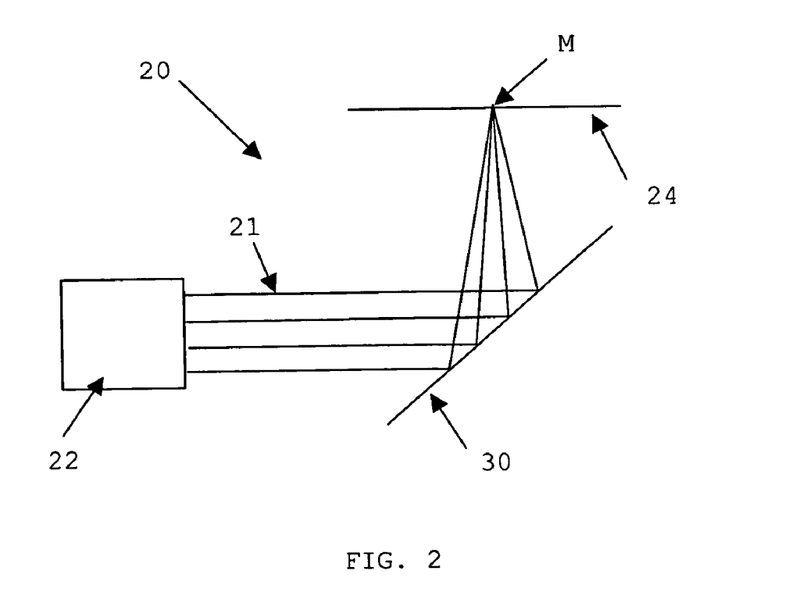
FIG. 2 is a schematic view of a two-dimensional image projection device in accordance with the present invention.

FIG. 2 a two-dimensional image projection device 20 comprising a light source 22, a lens array 30, and a projection plane 24. The light source 22 may be any conventional light source, such as a metal halide with a color wheel, a light emitted diode, a three (Red, Green, Blue) laser diode, or any other suitable light source. The light source generates Red, Green, and Blue ("RGB") light 21, which is reflected by the lens array 30 according to the image data, and focused onto the projection plane 24, where the resulting image is displayed.

Figure 3:
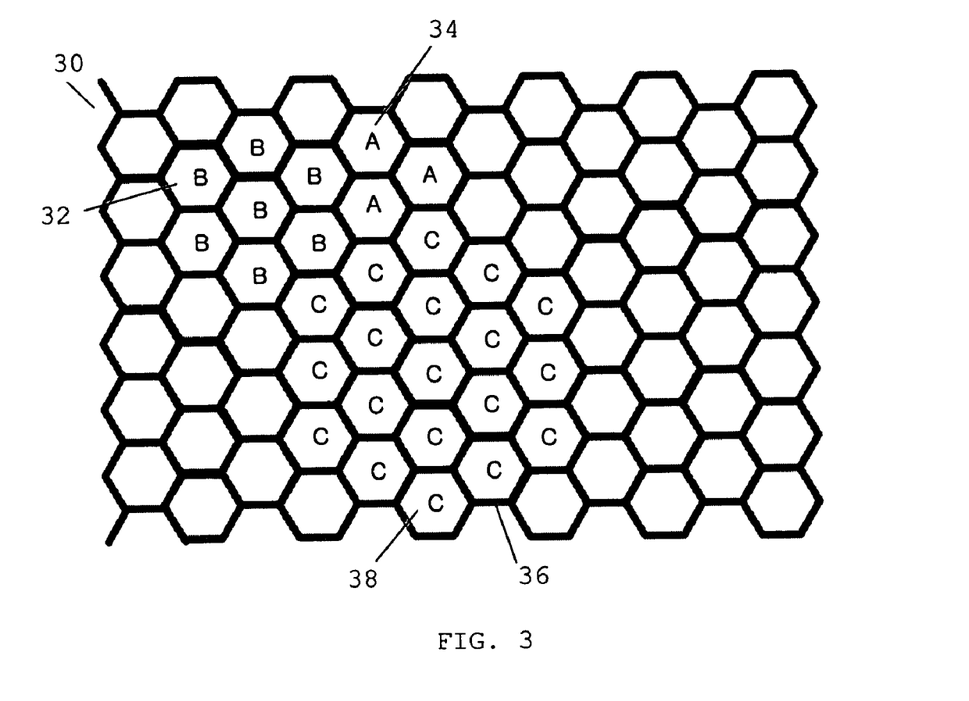
FIG. 3 is a partial top view of a lens array in accordance with the present invention.

Referring now to FIG. 3, the lens array 30 comprises a planar array of micromirror array lenses 32, 34, and 36. Each micromirror array lens comprises a plurality of micromirrors 38. The micromirrors 38 have the same function as a mirror and comprise a reflective surface made of metal, metal compound, or other materials with reflectivity. Many known microfabrication processes can used to fabricate a surface having high reflectivity. The micromirrors are individually controlled by actuating components that rotate and translate the micromirrors. The micromirrors are preferably parabolic in cross-section. This parabolic construction increases the focusing efficiency of the micromirror array lens, as discussed in further detail below.

The lens array 30 may comprise a series of micromirror array lenses 32, 34, and 36 arranged to form a substantially rectangular array. The basic configuration and operational principle of such a lens array is described in and U.S. patent application Ser. No. 10/857,714 (filed May, 28, 2004), the entire disclosure of which is incorporated herein by reference.

Figure 4A:
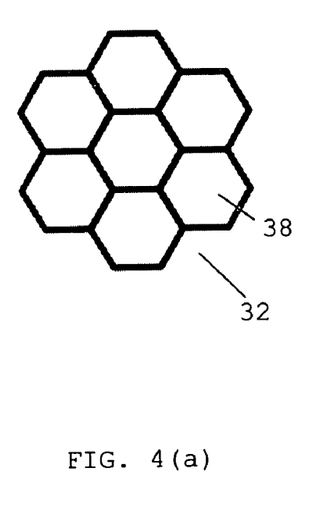
FIGS. 4(a) and (b) are top views of the micromirror array lenses comprising the lens array of FIG. 3.
Figure 4B:
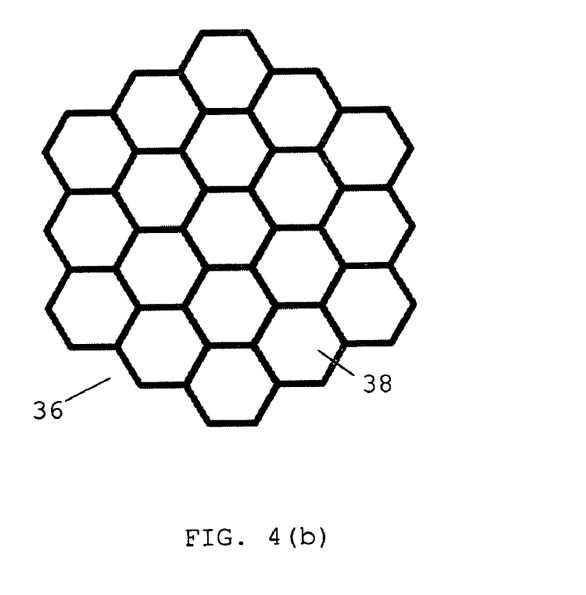

As shown in FIGS. 4(a) and 4(b), each micromirror array lens comprise an arbitrary number of micromirrors 38 that may vary in size and shape. However, it is preferred that the micromirrors comprise a hexagonal, rectangular, and/or square shape. These shapes enable the micromirrors to be easily fabricated and controlled.

In other embodiments, a cylindrical lens array or mixed lens array comprising cylindrical and/or circular lenses may be constructed.

Figure 5:
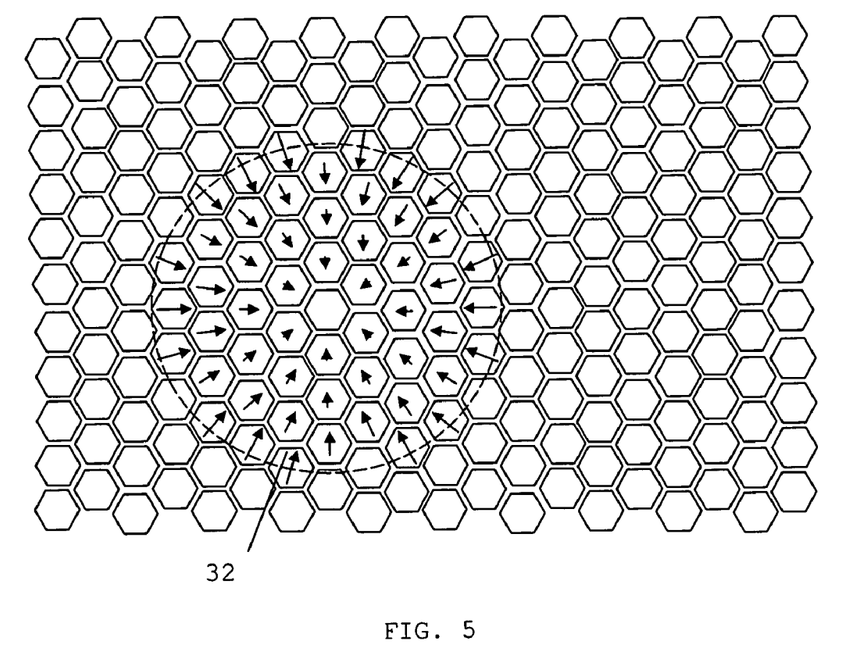
FIG. 5 is a top view of an array of micromirror array lenses at a first point in time, in accordance with principles of the present invention.
Figure 6:
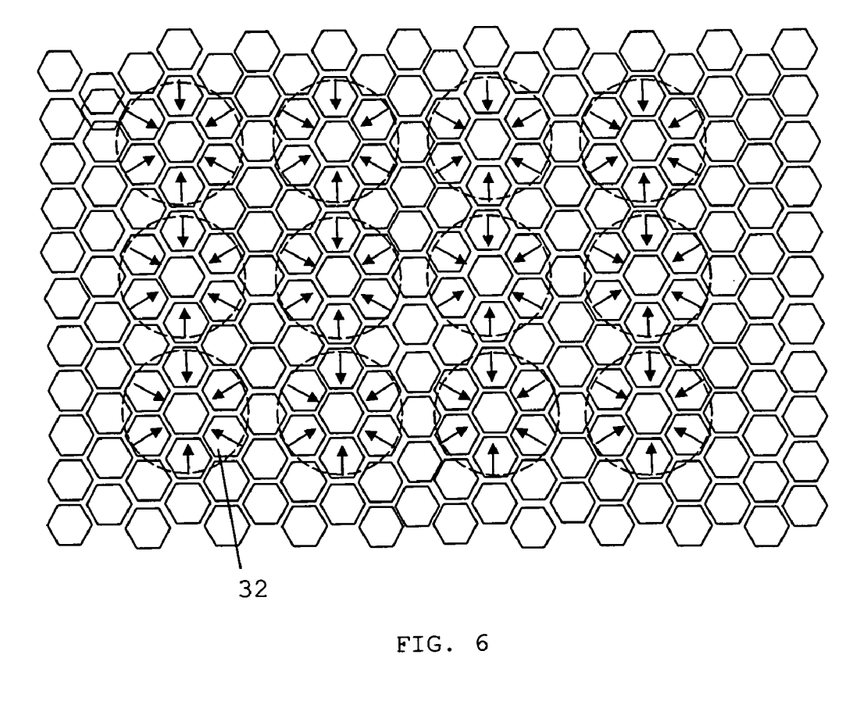
FIG. 6 is a top view of an array of micromirror array lenses at a another point in time, in accordance with principles of the present invention.

The relative positions of the micromirror array lens 32, 34, and 36 are not fixed in the plane of the lens array 30. Each micromirror array lens exists for a given time. According to the image signal, many different micromirror array lenses are "constructed" and "destroyed" within the frame speed. For example, one image frame may only require that the lens array 30 comprise only one micromirror array lens 32, as shown in FIG. 5. However, another image frame may require that the lens array comprise twelve micromirror array lenses 32, as shown in FIG. 6. For the purposes of the present invention, the word "variable" means all optical parameters, focal length, optical axis, lens size, the number of lenses, shape of lens, and others are changed according to the processed image data.

Even a group of micromirrors, in which the micromirrors are relatively separated or spaced apart, can construct a micromirror array lens so long as each micromirror has corresponding slant and the micromirrors are configured such that phases of the converging light are the same.

Figure 7:
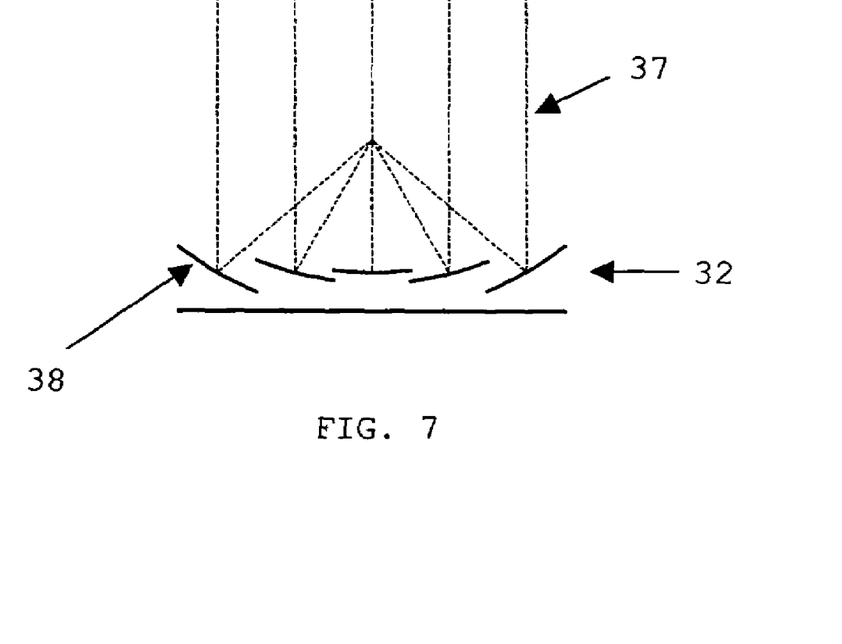
FIG. 7 is a schematic side view of a micromirror array lens in accordance with the present invention.

FIG. 7 illustrates how each micromirror array lens 32, 34, and 36 works. The micromirror array lens of the present invention is very similar to the prior art micromirror array lens proposed by J. Boyd and G. Cho in their paper entitled, "Fast-response Variable Focusing Micromirror Array Lens", *Proc. SPIE*, Vol. 5055, 278–286 (2003), the disclosure of which is hereby incorporated by reference as if set forth in full herein. As described above, the micromirror array lens 32 comprises many micromirrors 38. Each micromirror corresponds to a segment of a circle or a parabola. Unlike conventional concave mirrors, the micromirror array lens can change its focal length and direction of optical axis by controlling the slant of each segmental micromirror.

The micromirror array lens 32 produces an in-focus image pixel by converging collimated light 37 into one point M (see FIG. 2) on an image plane. This is accomplished by controlling the position of the micromirrors 38. The phases of the arbitrary light may be adjusted to the same phase by translating each one of the micromirrors. The required translational displacement range of the micromirrors is at least half of the wavelength of light.

The focal length F of the micromirror array lens 32 is changed by controlling the rotational and/or translational motion of each micromirror 38. Because the micromirrors can have rotational and translational motion, the micromirror array lens can be a Spatial Light Modulator (SLM). The micromirrors retract or elevate to length or shorten the optical path length of light scattered from the image, to remove phase aberrations from the image.

The mechanical structures upholding the micromirrors 38 and the actuating components that rotate and translate the micromirrors are located under the micromirrors to enable the micromirrors to be positioned closer to one another. This increases the effective reflective area of the micromirror array lens 32. Also, electric circuits to operate the micromirrors can be replaced with known microelectronic technologies, such as MOS or CMOS. Applying the circuits under the micromirror array, the effective area can be increased by removing necessary area for the electrode pads and wires used to supply actuating power. Since the micromirrors are small in mass and generate small moments of inertia, their positions and attitudes may be changed at rate of approximately 10 kHz. Therefore, the micromirror array lens becomes a high speed variable focusing lens having a focusing response speed of approximately 10 kHz.

As discussed above, it is desired that each micromirror 38 have a curvature because the ideal shape of a conventional reflective lens has a curvature. However, since the aberration of the micromirror array lens 32 with flat micromirrors is not much different from a conventional lens with curvature if the size of the micromirrors is small enough, there is not much need to control the curvature of the micromirrors.

Figure 8:
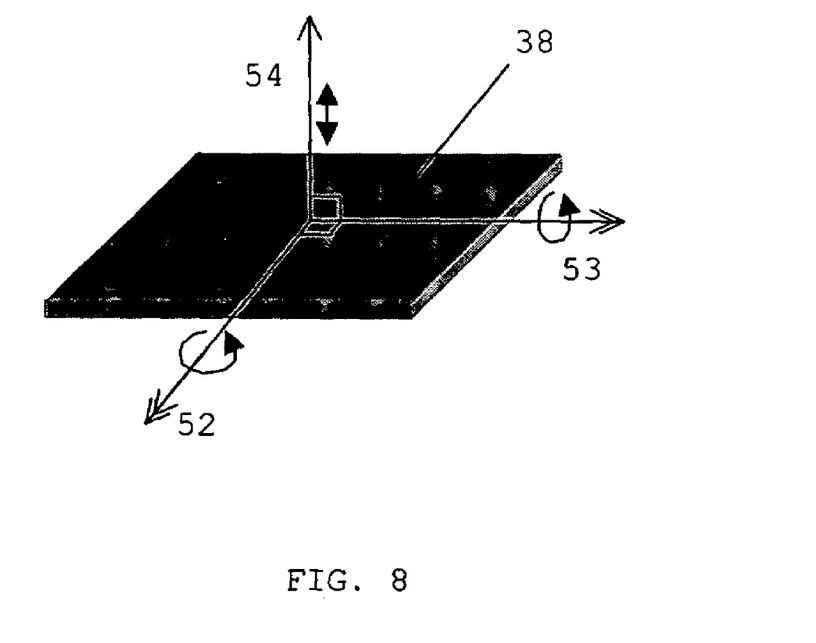
FIG. 8 is a perspective view showing the degrees-of-freedom of a micromirror in accordance with the present invention.

One benefit of the present invention is that it improves the operational method of prior art micromirror array lenses and modifies these lenses for easy implementation with existing two-dimensional image projectors. Accordingly, as shown in FIG. 8, the present invention provides each micromirror 38 with three degrees-of-freedom motion, one translational motion 54 along the normal axis to the plane of each micromirror array lens, and two rotational motions 52, 53 about two axes in the plane of each micromirror array lens. The translational motion is required to meet phase matching condition to compensate for aberrations. The two rotational motions are required to deflect light arbitrary direction and are essential for versatility of the array of micromirror array lenses. An array of micromirror array lenses with only two-degree-of-freedom rotational motion is also possible but its image quality may be deteriorated.

Figure 9:
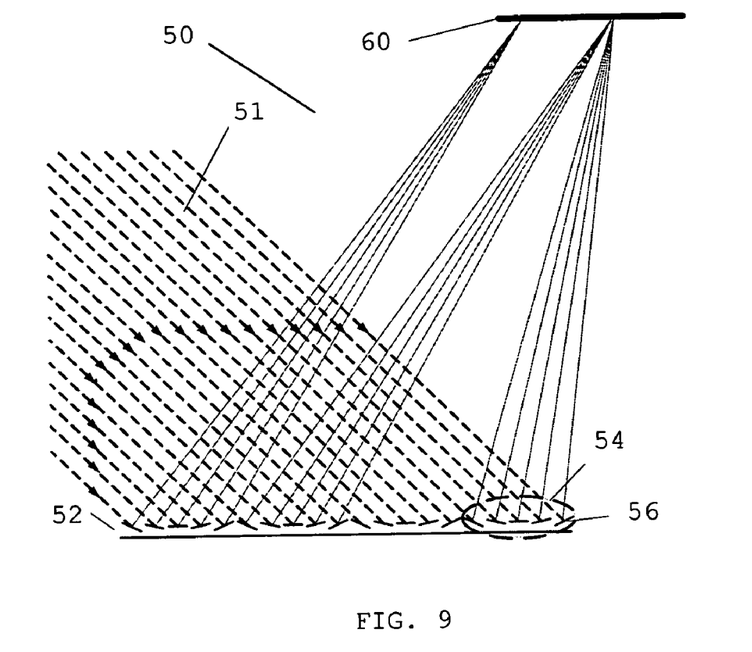
FIG. 9 is a schematic view illustration how a two-dimensional projection device in accordance with the present invention operates.

FIG. 9 illustrates the operation of a two-dimensional image projection device 50, such as a beam projector or a projection television, comprising a lens array 54 in accordance with principles of the present invention. Accordingly, a light source (not shown) generates collimated light 51 that incidents from the light source to the lens array 52. The light is reflected from the micromirror array lenses 56 and focused onto a projection plane 60, wherein the resulting image is viewed.

At any given image frame, the center or optical axis of a micromirror array lens may vary. Similarly, at any given image frame, the number of micromirrors comprising a micromirror array lens, or the focal length of a micromirror array lens may vary. Since each micromirror array lens has the ability to scan the in-focused light along the projection plane, any two or more micromirror array lenses can simultaneously focus incident light onto different positions, or the same position along the projection plane. Because each micromirror array lens can scan the whole plane 60 (i.e., focus the incident light at any position along the plane), the projected image can be generated.

Random Scanning Technique

Figure 10:
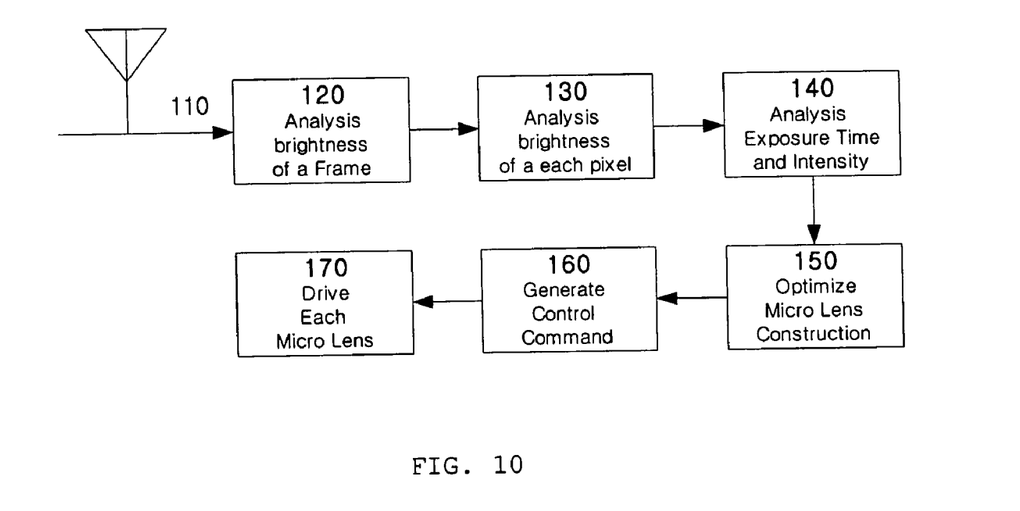
FIG. 10 is a block diagram describing the random scanning technique of two-dimensional image projection devices of the present invention.

Two-dimensional image projection devices of the present invention may apply a random scanning technique ("RST") to reduce the required number of micromirror array lenses comprising a lens array. FIG. 10 schematically illustrates how the RST is applied to such image projection devices.

The technique begins with an image signal 110 that is received from an antenna and/or receiving means. The signal is then processed by an image processor that analyses the average brightness of a frame 120. The image processor then analyses brightness of each pixels 130. Next, the image processor calculates the required light intensity and exposure time 140 for each pixel. The image processor then performs optimization 150. Through the optimization, the most optimized set of micromirror array lens combinations which can minimize the movement, minimize construction and destruction of the micromirror array lens, and the minimize scanning length for a frame rate is generated. According to the optimized lens combinations, a control command for a frame is generated 160. The control signal is sent to lens array to generate images on the screen. Because the response time of micromirror array lens (>10 kHz) is much faster than the frame speed (~30 Hz), a two-dimensional image projection system using array of micromirror array lenses and the random scanning technique can display much more pixels than the number of micromirror array lenses. By changing the number of micromirrors of each micromirror array lens and/or scanning speed (i.e., the duration of light exposure time) of the micromirror array lenses, the gray scale can be expressed easily. The fact that the required number of micromirror array lens is much smaller than the number of pixels makes the array of micromirror array lenses very small in size. Moreover, the display device can express fine images if the array of micromirrors comprise enough micromirrors.

Self Diagnosis & Correction Technique

Figure 11:
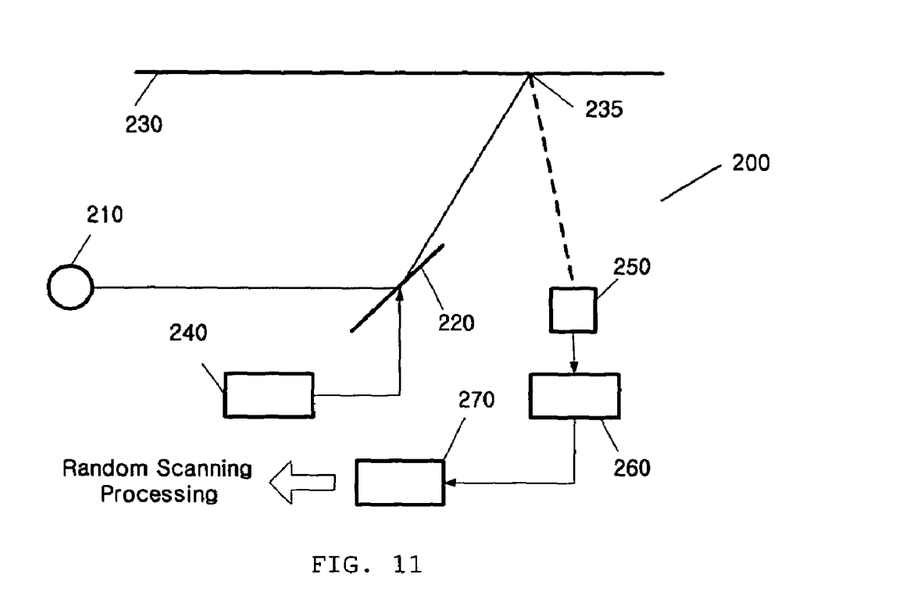
FIG. 11 is block diagram describing a self diagnosis and correction process for two-dimensional image projection devices of the present invention.

A self diagnosis & correction technique ("SDCT") may also be applied to a two-dimensional image projection device. During the SDTC, the image processor analyzes the deviations of each spot from a predetermined position and correct the scale factor of the corresponding micromirror. A simplified schematic diagram of the SDCT as applied to a two-dimensional image projection device of the present invention, is shown in FIG. 11. The SDCT system mainly consists of a light source 210, an image sensor 250, an image processor 260, read only memory (ROM) 270, a lens array 220, and controller 240.

This technique starts with the controller 240. The controller generates and sends a set of test signals to the lens array 220. Each of the micromirrors comprising the array are controlled by the test signal, and incident light from the light source 210 is deflected to several predetermined positions 235 along a projection plane 230 by the controlled micromirrors. The image sensor 250 comprises a photo detector that detects the light spots along the projection plane. The image sensor then sends an electrical signal comprising image data to the image processor 260. The image processor also decides the pass or failure of each micromirror. This test will be done for all micromirrors in the lens array. Because the response speed of the micromirrors are slightly less than 10 kHz, entire the test can be completed for all micromirrors within a few minutes. The test also can be done while viewers are watching the image device. The test results for all micromirrors in the array is written in the ROM 270 and become reference data for the random signal processing. In the random scanning processing for two-dimensional image displaying, the failed micromirrors are excluded in construction of micromirror array lenses.

Through the self diagnose process, failed micromirrors are identified. The random signal processor optimizes the control signals to exclude failed micromirrors in operation and to compensate by adjusting the micromirror array lens combination and scanning speed. By the SDCT, the displayed image can be maintained with the same quality even if as many as ten to twenty percent (10~20%) of micromirrors are failed. By applying SDCT, the reliability and operating lifetime of display device can be much improved.

When applying the present invention to a conventional two-dimensional display devices, the brightness of the projected image and power consumption of the display device are greatly improved by increasing light efficiency over prior art display devices. According to the prior art, the DMD array uses at most fifty percent (50%) of incident light because it has "on" and "off" positions. The light is dumped when the mirror is at "off" position. On the contrary, the array of micromirror array lenses can use most incident light by adopting the optimized Random Scanning Technique, discussed above. In that regard, the most power consuming element in a two-dimensional display device is projection lamp, and light efficiency is directly related to power consumption.

OTHER EMBODIMENTS

Another prospective application of present invention is a portable two-dimensional image projector, where the array of micromirror array lenses is incorporated into small electronic devices such as mobile phones, PDAs, camcorders, and other related devices. As mentioned above, the micromirror array lenses may be small in construction, which enables the array to be used with such devices.

Figure 12:
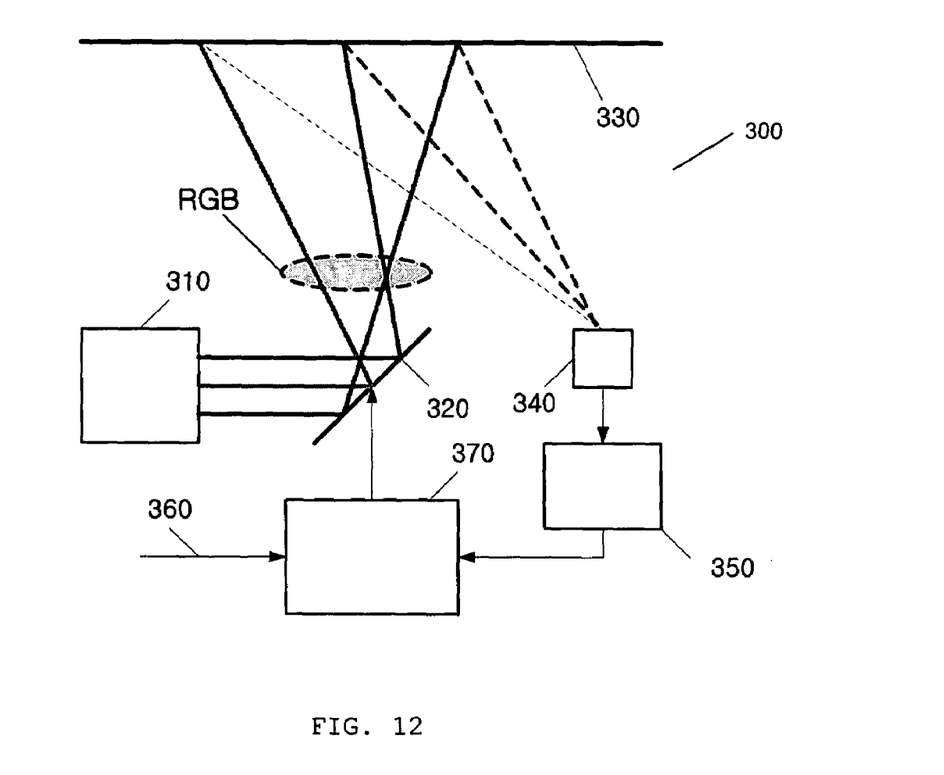
FIG. 12 is a schematic diagram of a portable electronic device comprising a lens array according the principles of the present invention.

FIG. 12 illustrates an example of a two-dimensional image projector of the present invention implemented within a small portable electronic device. In this embodiment, to miniaturize the two-dimensional image projector, a three (Red, Green, Blue) laser diode module 310 is used as a light source. To minimize undesirable effects, such as speckle and interference from coherent light, a broad band laser is preferable. An image signal 360 received from a broadcasting system, other outside device, or internal storage device is transmitted to a random scanning processing unit 370, which sends an optimized control signal to construct a lens array 320. The lens array deflects incident light from the laser diode to display an image. The image can be displayed on a screen, wall, or other suitable projection plane 330. An image sensor 340 implemented into the portable electronic device, comprises a photo detector that detects scattered light from the screen. The image sensor generates and sends to an automatic focusing image processor 350 an electrical signal carrying image data. The image processor contains an automatic focusing algorithm that analyzes the image data to determine the focusing status. The image processor then sends the focusing status to a random scanning processing unit 370. Random scanning processing unit sends a control signal to the micromirror array lenses to adjust the focusing of each of the micromirror lenses in the lens array.

In sum, the present invention improves the brightness and power consumption of conventional two-dimensional image projection systems. The present invention may be adapted to provide portable, pocked-sized, high quality two-dimensional image projection devices. Each of the micromirror array lenses comprising the lens array of the present invention may be controlled independently to have different focal lengths, different optical axes, lens sizes, and lens shapes. This enables the lens array to be applied in many applications. Further, each of the micromirror array lenses of the lens array may be controlled to scan a plane with different speeds, or a group of micromirror array lenses may be controlled to scan the same point on a plane simultaneously. This makes easy to control the light intensity on the screen.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of the invention.

Accordingly, the foregoing description should not be read as pertaining only to the precise structures described and illustrated in the accompanying drawings, but rather should be read consistent with and as support to the following claims, which are to have their fullest and fair scope.

What is claimed is:

1. A two-dimensional image projection device comprising an array of micromirror array lenses, wherein the micromirror array lenses comprise a plurality of micromirrors with at least one degree of freedom rotation, wherein the rotation of the micromirrors is controlled to change the focal length of the micromirror array lenses, wherein the array of micromirror array lenses scans light on a plane by the rotation of the micromirrors, the light being scanned by transversing the light focused from a micromirror array lens along the plane.

2. The image projection device of claim 1, wherein each micromirror array lens scans light along a plane independently from the other micromirror array lenses.

3. The image projection device of claim 1, wherein several micromirror array lenses scan the same positions in a plane simultaneously.

4. The image projection device of claim 1, wherein each of the micromirror array lenses scan the plane at different speeds.

5. The image projection device of claim 1, wherein the device scans the plane using a random scanning technique.

6. The image projection device of claim 1, wherein a gray scale is achieved by changing the scanning speed of the micromirrors.

7. The image projection device of claim 1, wherein a gray scale is achieved by varying the number of micromirrors of each micromirror array lenses.

8. The image projection device of claim 1, wherein a gray scale is achieved by changing the number of micromirror array lenses simultaneously focused on a point along the plane.

9. The image projection device of claim 1, wherein a gray scale is achieved by changing the scanning speed and size of the micromirror array lenses.

10. The image projection device of clan 1, wherein each micromirror has three degrees-of-freedom motion.

11. The image projection device of claim 1, wherein the device identifies defective micromirrors and re-calibrates the device by excluding the defective micromirrors and adjusting the combination of micromirror array lenses and respective speeds in which they scan the plane.

12. The image projection device of claim 1, further comprising:
   a light source that generates collimated light, wherein the light is reflected by the array of micromirror array lenses and focused at a point in space;
   a projection plane for displaying an image, wherein the light reflected by the array of micromirrors array lenses is focused onto projection plane;
   an image sensor comprising a photo detector that detects light spots along the projection plane, the image sensor generating an data signal comprising image data;
   an image processor in communication with the image sensor, wherein the image processor receives the data signal sent by the image sensor; and
   a controller that generates and sends to each the micromirror array lenses an control signal comprising control data to adjust the configuration of the micromirror array lenses.

13. The image projection device of claim 12, wherein the focused light corresponds to a pixel of a displayed image.

14. The image projector of claim 1, wherein the projector uses automatic focusing signal processing.

15. The image projector of claim 1, wherein the projector is embodied within a mobile phone.

16. The image projector of claim 1, wherein the projector is embodied within a personal digital assistant.

17. The image projector of claim 1, wherein the projector is embodied within a camcorder.

18. The image projector of claim 1, further comprising:
   a light source that produces collimated light, wherein the light is deflected by the array of micromirror array lenses and focused at a point in space;
   a projection plane for displaying an image, wherein the light deflected by the array of micromirror array lenses is focused onto the projection and an image is displayed;
   an image sensor comprising a photo detector that detects scattered light from the image, the image sensor generating a data signal comprising image data;
   an image processor in communication with the image sensor, wherein the image processor receives the data signal sent by the image sensor, analyzes the image data, and generates a status signal comprising image focusing status data; and
   a random scanning processing unit in communication with the image processor, wherein the random scanning processing unit receives the status signal sent by the image processor, and generates a control signal that is sent to the array of micromirror array lenses to adjust the focusing of the micromirror array lenses.

19. A method of focusing light on a point along a plane; comprising:
   generating light from a light source;
   providing an array of micromirror array lenses comprising a plurality of micromirrors which reflect and focus the light onto the plane, wherein the focused light corresponds to a pixel of a displayed image;
   receiving an image signal comprising image data, wherein the image data is transmitted to a processing unit and the processing unit sends an optimized control signal to the array of micromirror array lenses to adjust the focus of each micromirror array lenses;
   detecting light scattered from the displayed image to generate a data signal carrying image data;
   analyzing the data signal to produce a status signal carrying image focusing status data; and
   processing the image focusing status data to produce a control signal that is sent to the array of micromirror array lenses to adjust the focusing of each of the micromirror lenses in the array.

20. The method of claim 19, wherein the optimized control signal carries data to produce the most optimized set of micromirror array lens combinations.

21. A method of displaying an image on a plane, comprising:
   generating light from a light source;
   providing an array of micromirror array lenses comprising a plurality of micromirrors which reflect and focus the light onto the plane, wherein the focused light corresponds to a pixel of the displayed image;
   receiving an image signal comprising image data, wherein the image data is transmitted to a processing unit and the processing unit sends a control signal to the array of micromirror array lenses to adjust the focus of each micromirror array lenses; and
   focusing the light randomly at certain positions corresponding to the image data along the plane until the image is displayed.

22. The image projection device of claim 1, wherein each micromirror array lens can change its focal length independently from the other micromirror array lenses.

23. The image projection device of claim 1, wherein each micromirror array lens can change its optical axis independently from the other micromirror array lenses.

24. The image projection device of claim 1, wherein the number of micromirrors comprising one micromirror array lens independently varies from the number of micromirrors comprising the other micromirror array lenses.

* * * * *